(12) United States Patent
Wang et al.

(10) Patent No.: US 12,273,376 B2
(45) Date of Patent: Apr. 8, 2025

(54) IDENTIFYING COMPUTER SYSTEMS FOR MALWARE INFECTION MITIGATION

(71) Applicant: BRITISH TELECOMMUNICATIONS PUBLIC LIMITED COMPANY, London (GB)

(72) Inventors: Xiao-Si Wang, London (GB); Conor Hocking, London (GB); Bogdan Blaga, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 18/259,648

(22) PCT Filed: Dec. 1, 2021

(86) PCT No.: PCT/EP2021/083783
§ 371 (c)(1),
(2) Date: Jun. 28, 2023

(87) PCT Pub. No.: WO2022/144139
PCT Pub. Date: Jul. 7, 2022

(65) Prior Publication Data
US 2023/0396646 A1  Dec. 7, 2023

(30) Foreign Application Priority Data
Dec. 31, 2020  (GB) .................... 2020915

(51) Int. Cl.
*H04L 9/40*  (2022.01)
(52) U.S. Cl.
CPC ........ *H04L 63/145* (2013.01); *H04L 63/1416* (2013.01)

(58) Field of Classification Search
CPC ................ H04L 63/145; H04L 63/1416
USPC ........................................... 726/23
See application file for complete search history.

(56) References Cited

U.S. PATENT DOCUMENTS

| | | | |
|---|---|---|---|
| 8,667,581 B2 | 3/2014 | Steeves et al. | |
| 8,904,542 B2 * | 12/2014 | Amnon | H04L 63/1408 713/188 |
| 9,060,018 B1 * | 6/2015 | Yu | H04L 67/30 |
| 9,679,140 B2 | 6/2017 | Smith et al. | |
| 9,749,347 B2 | 8/2017 | Pinney Wood et al. | |
| 10,742,475 B2 | 8/2020 | Lai et al. | |
| 10,963,802 B1 | 3/2021 | Gardner et al. | |
| 11,190,534 B1 * | 11/2021 | Shah | H04L 63/1425 |
| 11,245,716 B2 | 2/2022 | Roelofs | |

(Continued)

FOREIGN PATENT DOCUMENTS

| | | |
|---|---|---|
| CA | 2787933 | 8/2017 |
| CN | 1841397 A | 10/2006 |

(Continued)

OTHER PUBLICATIONS

Atwood J., et al., "Fair Treatment Allocations in Social Networks," arXiv:1911.05489v1, Nov. 1, 2019, 11 pages.

(Continued)

*Primary Examiner* — Badrinarayanan
(74) *Attorney, Agent, or Firm* — EIP US LLP

(57) ABSTRACT

A computer implemented malware protection method to mitigate malware spread within a set of communicating computer systems from an infected computer system is disclosed.

5 Claims, 2 Drawing Sheets

(56) References Cited

U.S. PATENT DOCUMENTS

| | | | |
|---|---|---|---|
| 11,349,857 B1* | 5/2022 | Shah | G06F 16/9024 |
| 11,397,258 B2 | 7/2022 | Zeng et al. | |
| 11,423,143 B1 | 8/2022 | Lin | |
| 11,470,103 B2 | 10/2022 | Dean et al. | |
| 11,470,109 B2 | 10/2022 | Wang et al. | |
| 11,500,058 B2* | 11/2022 | Hu | G01S 13/003 |
| 11,704,431 B2* | 7/2023 | Kraus | H04L 63/0414 |
| | | | 726/26 |
| 11,727,109 B2 | 8/2023 | Speakman et al. | |
| 11,829,484 B2 | 11/2023 | Lipkis et al. | |
| 12,046,040 B2 | 7/2024 | Wang et al. | |
| 12,126,636 B2 | 10/2024 | Dean et al. | |
| 2003/0105973 A1 | 6/2003 | Liang et al. | |
| 2005/0050338 A1 | 3/2005 | Liang et al. | |
| 2005/0248457 A1 | 11/2005 | Himberger et al. | |
| 2007/0220606 A1* | 9/2007 | Omote | H04L 63/145 |
| | | | 726/24 |
| 2008/0005124 A1 | 1/2008 | Jung et al. | |
| 2009/0133123 A1 | 5/2009 | Radha et al. | |
| 2010/0199349 A1 | 8/2010 | Ellis | |
| 2011/0078797 A1 | 3/2011 | Beachem | |
| 2013/0305357 A1 | 11/2013 | Ayyagari | |
| 2013/0340080 A1* | 12/2013 | Gostev | H04L 63/145 |
| | | | 726/24 |
| 2014/0237599 A1 | 8/2014 | Gertner | |
| 2015/0026027 A1 | 1/2015 | Priess | |
| 2015/0341379 A1 | 11/2015 | Lefebvre | |
| 2018/0004948 A1* | 1/2018 | Martin | H04L 63/1425 |
| 2018/0144139 A1 | 5/2018 | Cheng | |
| 2018/0309778 A1 | 10/2018 | Sugarbaker | |
| 2018/0375889 A1 | 12/2018 | Dickenson | |
| 2019/0028496 A1* | 1/2019 | Fenoglio | H04L 63/1425 |
| 2019/0052659 A1* | 2/2019 | Weingarten | H04L 67/34 |
| 2019/0266297 A1 | 8/2019 | Krause | |
| 2020/0021607 A1 | 1/2020 | Muddu | |
| 2020/0064444 A1* | 2/2020 | Regani | G01S 7/006 |
| 2021/0021636 A1 | 1/2021 | Sbandi | |
| 2021/0144168 A1 | 5/2021 | Vester et al. | |
| 2022/0086179 A1* | 3/2022 | Levin | H04W 12/63 |
| 2022/0116411 A1 | 4/2022 | Melicher et al. | |
| 2023/0100643 A1 | 3/2023 | Wang et al. | |
| 2023/0161874 A1 | 5/2023 | Wang et al. | |
| 2023/0376598 A1 | 11/2023 | Wang et al. | |
| 2024/0310851 A1 | 9/2024 | Ebrahimi et al. | |

FOREIGN PATENT DOCUMENTS

| | | |
|---|---|---|
| CN | 104166708 A | 11/2014 |
| CN | 105359484 A | 2/2016 |
| CN | 106027513 A | 10/2016 |
| CN | 106599691 A | 4/2017 |
| CN | 106656571 A | 5/2017 |
| CN | 106936855 A | 7/2017 |
| CN | 109190375 A | 1/2019 |
| EP | 1835429 A2 | 9/2007 |
| EP | 1990973 A2 | 11/2008 |
| EP | 1995929 A2 | 11/2008 |
| EP | 1990973 B1 | 8/2015 |
| EP | 1410565 | 11/2017 |
| GB | 2574093 A | 11/2019 |
| GB | 2574093 B | 10/2020 |
| KR | 101825911 B1 | 2/2018 |
| RU | 91203 U1 | 1/2010 |
| WO | WO-2006132987 A1 | 12/2006 |
| WO | 2008005376 A2 | 1/2008 |
| WO | WO-2019185404 A1 | 10/2019 |
| WO | WO-2019185405 A1 | 10/2019 |
| WO | 2020065737 A1 | 4/2020 |
| WO | WO-2021001237 A1 | 1/2021 |
| WO | WO-2021165256 A1 | 8/2021 |
| WO | WO-2021165257 A1 | 8/2021 |
| WO | WO-2021198295 A1 | 10/2021 |

OTHER PUBLICATIONS

Beyah R. A., et al., "The Case for Collaborative Distributed Wireless Intrusion Detection Systems," Granular Computing, IEEE International Conference on Atlanta, 2006, pp. 782-787.

Combined Search and Examination Report under sections 17 & 18(3) for Great Britain Application No. 2203355.9, mailed on Oct. 10, 2022, 12 pages.

Combined Search and Examination Report under sections 17 & 18(3) for Great Britain Application No. 2203366.6, mailed Oct. 21, 2022, 12 pages.

Combined Search and Examination Report under sections 17 & 18(3) for Great Britain Application No. 2203361.7, mailed Oct. 17, 2022, 12 pages.

Combined Search and Examination Report under Sections 17 and 18(3) for Great Britain Application No. 2002121.8, mailed Aug. 4, 2020, 6 pages.

Combined Search and Examination Report under Sections 17 and 18(3) for Great Britain Application No. 2004994.6, mailed Jul. 13, 2020, 5 pages.

Combined Search and Examination Report under Sections 17 and 18(3) for Great Britain Application No. 2020915.1, mailed on May 11, 2021, 5 pages.

Combined Search and Examination Report under Sections 17 and 18(3) for Great Britain Application No. 2203371.6, mailed on Nov. 3, 2022, 12 pages.

Eder-Neuhauser P., et al., "Malware Propagation in Smart Grid Networks: Metrics, Simulation and Comparison of Three Malware Types," Journal of Computer Virology and Hacking Techniques, 2018, vol. 15, 17 pages.

Examination Report under 18(3) for Great Britain Application No. 2002122.6, mailed Nov. 30, 2021, 3 pages.

Extended European Search Report for Application No. 20157626.1, mailed on Jun. 12, 2020, 10 pages.

Extended European Search Report for Application No. 20157627.9, mailed on Jun. 12, 2020, 9 pages.

Extended European Search Report for Application No. 20168112.9, mailed on Sep. 4, 2020, 9 pages.

Faghani M.R., et al., "A Study of Trojan Propagation in Online Social Networks," 5th International Conference on New Technologies, Mobility and Security, 2012, pp. 3482-3486.

Guillen J.D.H., et al., "A Mathematical Model for Malware Spread on WSNs with Population Dynamics," Physica A, Nov. 22, 2019, vol. 545, 11 pages.

Hosseini S., "Defense Against Malware Propagation in Complex Heterogeneous Networks," Cluster Computing, Sep. 12, 2020, vol. 24, No. 2, pp. 1199-1215.

International Preliminary Report on Patentability for Application No. PCT/EP2021/053764, mailed on Sep. 1, 2022, 9 pages.

International Preliminary Report on Patentability for Application No. PCT/EP2021/058360, mailed on Aug. 11, 2022, 14 pages.

International Preliminary Report on Patentability for PCT/EP2021/053763 mailed Sep. 1, 2022, 9 pages.

International Search Report and Written Opinion for Application No. PCT/EP2021/053763 mailed on Mar. 9, 2021, 13 pages.

International Search Report and Written Opinion for Application No. PCT/EP2021/053764 mailed on Mar. 9, 2021, 13 pages.

International Search Report and Written Opinion for Application No. PCT/EP2021/058360 mailed on Jun. 2, 2021, 12 pages.

International Search Report and Written Opinion for Application No. PCT/EP2021/083783, mailed on Mar. 1, 2022, 15 pages.

Jia Z., et al., "Research on Computer Virus Source Modeling with Immune Characteristics," 2017 29th Chinese Control and Decision Conference (CCDC), May 28, 2017, pp. 4616-4619.

Khan M.S., et al., "Cognitive Modeling of Polymorphic Malware using Fractal Based Semantic Characterization," IEEE International Symposium on Technologies for Homeland Security (HST), 2017, 7 pages.

Liu G., et al., "An Approach to Finding the Cost-effective Immunization Targets for Information Assurance," Decision Support Systems, Nov. 2014, vol. 67, pp. 40-52.

(56) References Cited

OTHER PUBLICATIONS

Liu W., et al., "Web Malware Spread Modelling and Optimal Control Strategies," Scientific Reports, Feb. 10, 2017, vol. 7(42308), 19 pages.
Matsubara Y., et al., "Nonlinear Dynamics of Information Diffusion in Social Networks," ACM Transactions on the Web, Apr. 2017, vol. 11, No. 2, Article 11, 40 pages.
Mieghem P.V., "The Viral Conductance of a Network", Computer Communications, vol. 35, Apr. 18, 2012, pp. 1494-1506.
Muchnik L., et al., "Initial Growth Rates of Epidemics Fail to Predict their Reach: A Lesson from Large Scale Malware Spread Analysis," Aug. 2, 2020, pp. 1-16.
Search Report under Section 17(5) for Great Britain Application No. 2002122.6, mailed on Aug. 4, 2020, 4 pages.
Wang C., et al., "On Computer Viral Infection and the Effect of Immunization," Proceedings 16th Annual Computer Security Applications Conference (ACSAC'00), Dec. 11-15, 2000, pp. 246-256.
Wright R., "What is polymorphic virus?—Definition from WhatIs.com," 2021, 5 pages.
Written Opinion of the International Preliminary Examining Authority for Application No. PCT/EP2021/058360, mailed on Apr. 22, 2022, 7 pages.
Xu S., et al., "Analysis of Malware-Induced Cyber Attacks in Cyber-Physical Power Systems," IEEE Transactions on Circuits and Systems II, 2020, 5 pages.
Combined Search and Examination Report received for Great Britain Patent Application No. 1804775.3, mailed on Sep. 28, 2018, 6 pages.
Combined Search and Examination Report received for Great Britain Patent Application No. 1804776.1, mailed on Sep. 26, 2018, 6 pages.
Combined Search and Examination Report received for Great Britain Patent Application No. 1804777.9, mailed on Sep. 26, 2018, 7 pages.
Combined Search and Examination Report received for Great Britain Patent Application No. 1903788.6, mailed on Sep. 20, 2019, 6 pages.
Extended European Search Report received for European Patent Application No. 18163821.4, mailed on Jul. 23, 2018, 9 pages.
Extended European Search Report received for European Patent Application No. 18163823.0, mailed on Jun. 26, 2018, 7 pages.
International Preliminary Report on Patentability received for PCT Patent Application No. PCT/EP2019/056887, mailed on Oct. 8, 2020, 8 pages.
International Preliminary Report on Patentability received for PCT Patent Application No. PCT/EP2019/056888, mailed on Oct. 8, 2020, 8 pages.
International Preliminary Report on Patentability received for PCT Patent Application No. PCT/EP2021/076482, mailed on Apr. 13, 2023, 12 pages.
International Preliminary Report on Patentability received for PCT Patent Application No. PCT/EP2021/083783, mailed on Jul. 13, 2023, 8 pages.
International Search Report and Written Opinion received for PCT Patent Application No. PCT/EP2021/076482, mailed on Nov. 11, 2021, 18 pages.
International Search Report and Written Opinion received for PCT Patent Application No. PCT/EP2019/056887, mailed on Apr. 12, 2019, 10 pages.
International Search Report and Written Opinion received for PCT Patent Application No. PCT/EP2019/056888, mailed on Apr. 12, 2019, 10 pages.
Office Action and Search Report received for Chinese Patent Application No. 201980021010.4, mailed on Feb. 18, 2022, 11 pages (7 pages of English Translation and 4 pages of Official Copy).
Office Action received for Chinese Patent Application No. 201980021086.7, mailed on May 7, 2022, 8 pages (4 pages of English Translation and 4 pages of Official Copy).
Search Report received for Great Britain Patent Application No. 2015374.8, mailed on Jun. 24, 2021, 4 pages.
Bose, Abhijit, "Propagation, Detection and Containment of Mobile Malware", Computer Science and Engineering, 2008, 164 pages.
Feng et al., "Dynamical Analysis and Control Strategies on Malware Propagation Model", Applied Mathematical Modelling, vol. 37, Apr. 3, 2013, pp. 8225-8236.
Guo et al., "Impact of Network Structure on Malware Propagation: A Growth Curve Perspective", Journal of Management Information Systems, 2016, vol. 33, No. 1, pp. 296-325.
Angel Martin, Del Rey, "Mathematical Modeling of the Propagation of Malware: A Review", Security and Communication Networks, vol. 8, Jan. 28, 2015, pp. 2561-2579.
International Search Report and Written Opinion received for PCT Patent Application No. PCT/EP2023/053486, mailed on Apr. 13, 2023, 13 pages.
International Search Report and Written Opinion received for PCT Patent Application No. PCT/EP2023/053489, mailed on Apr. 13, 2023, 13 pages.
International Search Report and Written Opinion received for PCT Patent Application No. PCT/EP2023/053493, mailed on Apr. 21, 2023, 13 pages.
International Search Report and Written Opinion received for PCT Patent Application No. PCT/EP2023/053494, mailed on Apr. 21, 2023, 13 pages.
"Office Action received for European Patent Application No. 21824337.6, mailed on Jul. 1, 2024", 5 pages.

* cited by examiner

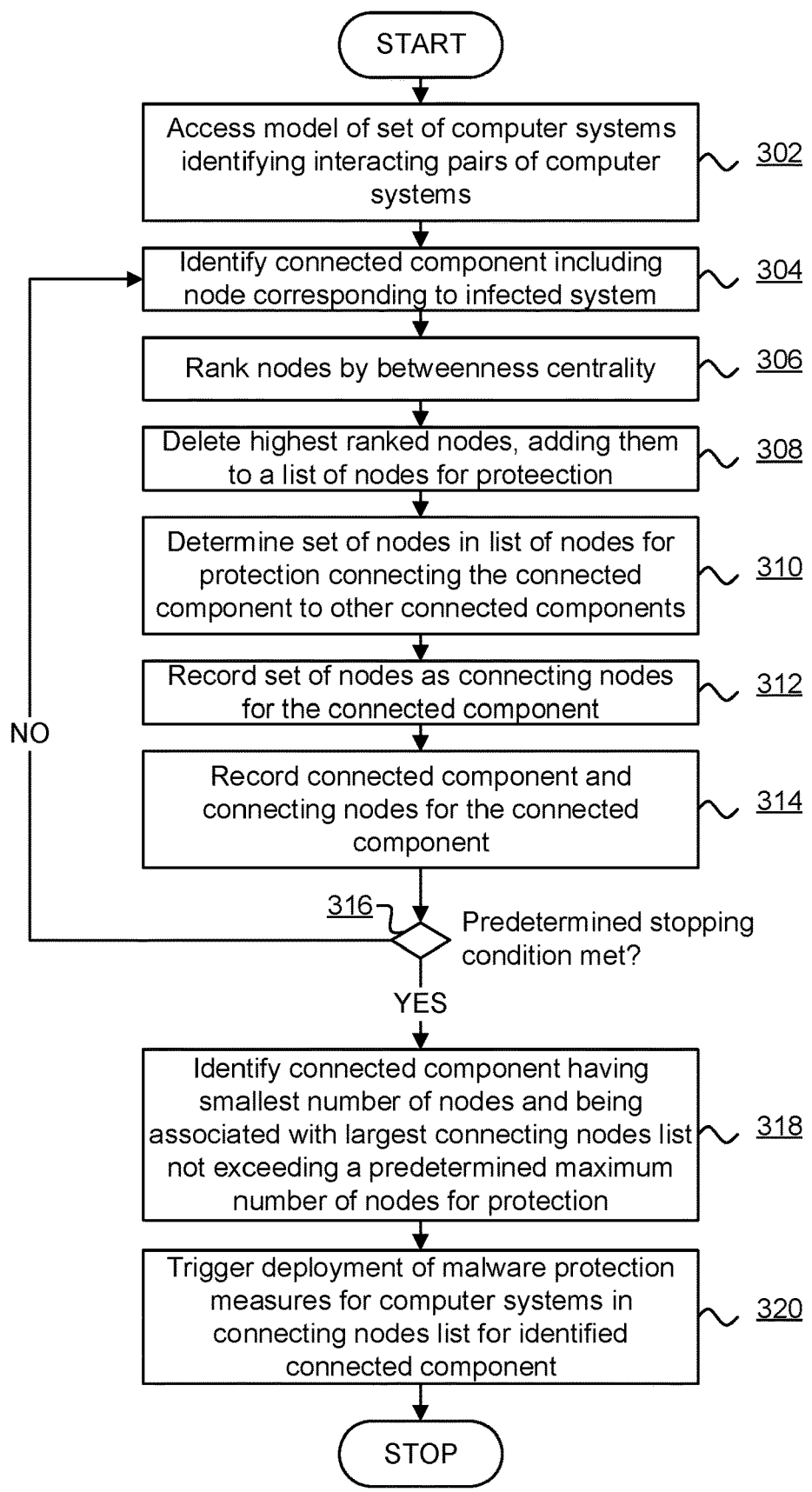

IDENTIFYING COMPUTER SYSTEMS FOR MALWARE INFECTION MITIGATION

PRIORITY CLAIM

The present application is a National Phase entry of PCT Application No. PCT/EP2021/083783, filed Dec. 1, 2021, which claims priority from GB Patent Application No. 2020915.1, filed Dec. 31, 2020, each of which is hereby fully incorporated herein by reference.

TECHNICAL FIELD

The present disclosure relates to the propagating of malware across a set of computer systems and the automatic mitigation of the malware at targeted computer systems.

BACKGROUND

Conventional malware protection mechanisms are reactive to the detection of malware in a network or the widespread distribution of anti-malware measures. Such approaches are known as "diagnosis and treatment". Similar techniques are used to combat the spread of biological infections. Mitigation measures such as anti-malware or malware-specific protective measures may not be known for some time after an infection has been studied for its effects. Further, the deployment of mitigation measures to an entire population of susceptible hosts in short order can be impractical and can involve rendering hosts unusable during the critical malware propagation period. Accordingly, it is beneficial to provide improvements to the deployment of protections for malware for critical computer systems.

SUMMARY

According to a first aspect of the present disclosure, there is provided a computer implemented malware protection method to mitigate malware spread within a set of communicating computer systems from an infected computer system, the method comprising: accessing a model of the set of computer systems, the model identifying interacting pairs of the computer systems in the set based on interactions corresponding to previous communication occurring between the computer systems in the pairs, wherein the model includes a graph representation of the computer systems as nodes and interactions therebetween as edges; iteratively processing the graph including: i. identifying a connected component of the graph including a node corresponding to the infected computer system; ii. ranking nodes in the identified component by betweenness centrality and removing one or more highest ranked nodes from the connected component, recording an identification of the connected component and adding the removed highest ranked nodes to a list of nodes for protection, iii. determining a set of nodes in the list of nodes for protection that connect the connected component to other connected components as the connecting nodes list for the connected component; wherein the iteration terminates when the identified connected component satisfies a predetermined stopping condition, the method further comprising: receiving a predetermined maximum number of nodes for protection; identifying a connected component having a smallest number of nodes and being associated with a largest connecting nodes list not exceeding the predetermined maximum number of nodes for protection; and triggering the deployment of malware protection measures in respect of computer systems represented by nodes in the connecting nodes list for the identified connected component.

In some embodiments, the method further comprises: determining a subgraph of the graph, the subgraph including the node corresponding to the infected computer system and a set of nodes within a predetermined path length therefrom, wherein the predetermined stopping condition includes a condition that an identified connected component is equal to or a subset of the determined subgraph.

In some embodiments, the method further comprises: simulating propagation of the malware between nodes in the identified connected component; simulating the application of malware protection measures applied at nodes selected by each of a plurality of node selection methods, each node selection method determining a subset of nodes in the connecting nodes list for the identified connecting component for deployment of protection measures, wherein the deployment of malware protection measures is triggered for computer systems corresponding to nodes selected by a node selection method determined to be most efficacious in mitigating the spread of the malware.

According to a second aspect of the present disclosure, there is a provided a computer system including a processor and memory storing computer program code for performing the method set out above.

According to a third aspect of the present disclosure, there is a provided a computer system including a processor and memory storing computer program code for performing the method set out above.

BRIEF DESCRIPTION OF THE DRAWINGS

Embodiments of the present disclosure will now be described, by way of example only, with reference to the accompanying drawings, in which:

FIG. 3 is a flowchart of a malware protection method according to an embodiment of the present disclosure.

DETAILED DESCRIPTION

Figure 1:
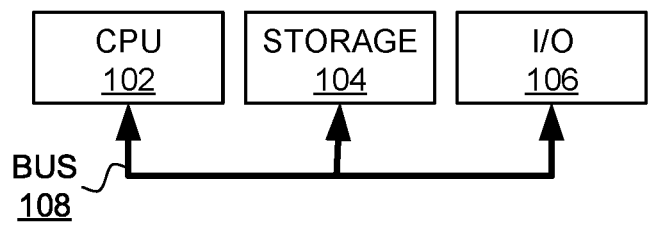
FIG. 1 is a block diagram of a computer system suitable for the operation of embodiments of the present 5 disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Malicious software, also known as computer contaminants or malware, is software that is intended to do direct or indirect harm in relation to one or more computer systems. Such harm can manifest as the disruption or prevention of the operation of all or part of a computer system, accessing private, sensitive, secure and/or secret data, software and/or resources of computing facilities, or the performance of illicit, illegal or fraudulent acts. Malware includes, inter alia, computer viruses, worms, botnets, trojans, spyware, adware, rootkits, keyloggers, dialers, malicious browser extensions or plugins and rogue security software.

Malware proliferation can occur in a number of ways. Malware can be communicated as part of an email such as an attachment or embedding. Alternatively, malware can be disguised as, or embedded, appended or otherwise communicated with or within, genuine software. Some malware is able to propagate via storage devices such as removable, mobile or portable storage including memory cards, disk drives, memory sticks and the like, or via shared or network attached storage. Malware can also be communicated over computer network connections such as the internet via websites or other network facilities or resources. Malware can propagate by exploiting vulnerabilities in computer systems such as vulnerabilities in software or hardware components including software applications, browsers, operating systems, device drivers or networking, interface or storage hardware.

A vulnerability is a weakness in a computer system, such as a computer, operating system, network of connected computers or one or more software components such as applications. Such weaknesses can manifest as defects, errors or bugs in software code that present an exploitable security weakness. An example of such a weakness is a buffer-overrun vulnerability, in which, in one form, an interface designed to store data in an area of memory allows a caller to supply more data than will fit in the area of memory. The extra data can overwrite executable code stored in the memory and thus such a weakness can permit the storage of malicious executable code within an executable area of memory. An example of such malicious executable code is known as 'shellcode' which can be used to exploit a vulnerability by, for example, the execution, installation and/or reconfiguration of resources in a computer system. Such weaknesses, once exploited, can bootstrap a process of greater exploitation of a targeted system, and propagation of the malware to other computer systems.

The effects of malware on the operation and/or security of a computer system lead to a need to identify malware in a computer system in order to implement protective and/or remedial measures. While malware detection is often directed to computer systems themselves or the networks over which they communicate, embodiments of the present disclosure recognize that interactions between computer systems transcend the physical interconnections therebetween. In particular, embodiments of the present disclosure are directed to addressing interactions between computer systems that arise from communication between pairs of computer systems. Such interactions can include, for example, interactions between users of each of a pair of computer systems using, inter alia, social media, messaging, electronic mail or file sharing facilities. Thus, embodiments of the present disclosure employ a model of a set of computer systems in which interacting pairs of computer systems are identified, such interactions being based on previous communication occurring between the computer systems in the pair. Notably, such a model disregards intermediates in an interaction—such as physical resources or other computer systems involved in a communication. For example, an interaction arising from a social media communication between two users using each of a pair of computer systems will involve potentially multiple physical or logical networks, intermediate servers, service provider hosts, intermediate communication appliances and the like. Thus, a model of the physical communication becomes burdened by the intermediate features of a typical inter-computer communication. In contrast, embodiments of the present disclosure address the endpoints of an interaction such as the computer systems through which users communicate. A similar analysis can be conducted for interactions involving email, electronic messaging, file sharing and the like.

Embodiments of the present disclosure are directed to the deployment of malware protection measures at specific target computer systems within a set of communicating computer systems. Communications between the computer systems may be performed via communications networks, correspondence exchange, social networks, file sharing or other suitable communications means. Such computer systems can thus be modelled as pairs of communicating computer systems that may be represented by way of a graph as described below. Embodiments of the present disclosure are operable in response to a detection of a malware infection at a computer system in the set and provide for the targeted deployment of malware protection measures so as to efficiently protect other computer systems in the set. For example, installation of malware protection measures can involve the temporary disconnection or cessation of network communications for one or more selected systems, a temporary cessation of operation of the one or more selected systems, a reconfiguration of the one or more selected systems, an installation of malware protection measures such as anti-malware, anti-virus or other protection measures, and other protection measures as will be apparent to those skilled in the art.

Figure 2:
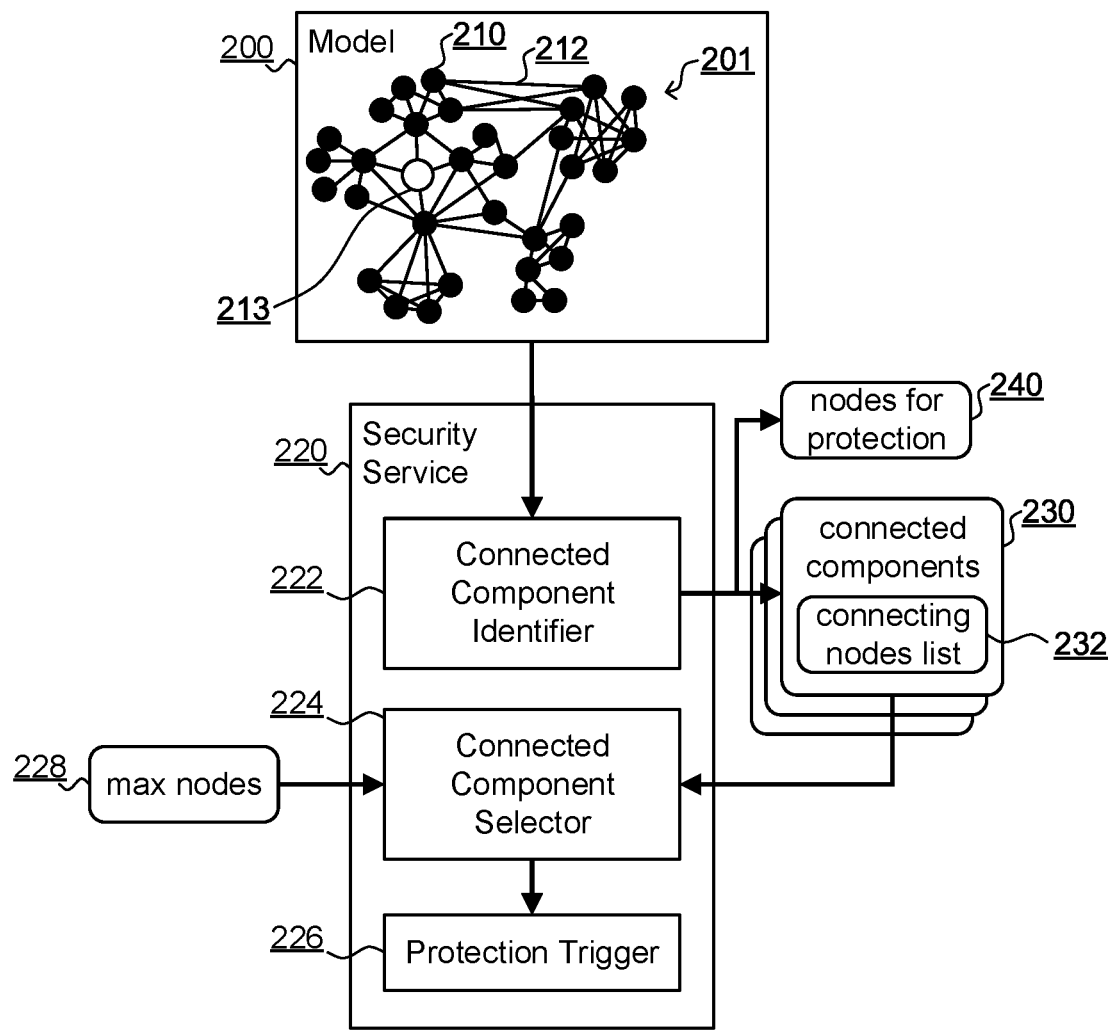
FIG. 2 is a component diagram of an arrangement for malware protection to mitigate malware spread within a set of communicating computer systems from an infected computer system according to an embodiment of the present disclosure.

FIG. 2 is a component diagram of an arrangement for malware protection to mitigate malware spread within a set of communicating computer systems from an infected computer system according to an embodiment of the present disclosure. A model 200 is provided as one or more data structures representing a set of computer systems and interactions therebetween. The model 200 is provided as a graph 201 data structure including nodes or vertices 210, each corresponding to a computer system, and edges 212 each connecting a pair of nodes 210 and representing interaction between computer systems corresponding to each node in the pair. Thus, an edge 212 represents interaction between a pair of computer systems. Each node 210 can have associated information for a corresponding computer system including, for example, inter alia: an identifier of the computer system; an identification of an organizational affiliation of the computer system; an identifier of a subnet to which the computer system is connected; and other information as will be apparent to those skilled in the art. A computer system 213 is identified by a node in the graph 201 as an origin of a malware infection, such as a computer system currently infected by a malware or known to have been exposed to a malware infection.

In some embodiments, an edge 212 constitutes an indication that at least one interaction has taken place over at least a predetermined historic time period between computer systems in a pair. In some embodiments, the existence of an edge 212 is not determinative, indicative or reflective of a degree, frequency or propensity of interaction between computer systems in a pair—rather, the edge 212 identifies that interaction has taken place. In some embodiments, edges 212 can have associated, for example, inter alia: an edge identifier; an identification of a pair of nodes (and/or the corresponding computer systems) that the edge interconnects; and/or interaction frequency information between a pair of computer systems. It will be appreciated by those skilled in the art that, while the model 200 is illustrated as a literal graph 201 in the arrangement of FIG. 2, alternative data structures and logical representations of a graph of vertices and edges can be used, such as representations employing, for example, inter alia, vectors, arrays of vectors, matrices, compressed data structures, tables and the like.

The arrangement of FIG. 2 includes a security service 220 as a hardware, software, firmware or combination component operable to provide malware protection measures to computer systems in the set of computer systems represented by the graph 201. In particular, the security service 220 identifies a subset of nodes in the graph 201 corresponding to computer systems at which the deployment of malware protection measures is to be triggered to provide effective protection to computer systems in the set of systems. The security service 220 includes a connected component identifier 222 for performing an iterative process of identifying connected components in the graph 201 that include a node corresponding to the infected computer system 213. A connected component (also known as a "component") is a structure of an undirected graph in graph theory that is an induced subgraph in which any two vertices are connected to each other by paths, and which is connected to no additional vertices in the rest of the graph 201. The method of the connected component identifier 222 is to iteratively identify and record connected components 230 in the graph 201 and to remove one or more nodes from each identified connected component (and the graph 201), recording an identification of the removed nodes in a list, herein referred to as a list of nodes for protection 240.

The nodes removed from each identified connected component are determined based on a ranking of nodes in the connected component, the ranking being determined by an evaluation of betweenness centrality for each node in the connected component. Betweenness centrality is a measure of centrality in a graph based on shortest paths. For every pair of nodes in a connected component, there exists at least one shortest path between the nodes such that a number of edges that the path passes through is minimized. The betweenness centrality for each node is the number of these shortest paths that pass through the node. One or more nodes ranked as having the highest betweenness centrality are removed from the connected component (and the graph 201) for recording in the list of nodes for protection 240. The connected component identifier 222 is further operable to determine, for each connected component, a connecting nodes list 232 as a subset of nodes in the list of nodes for protection 240 that connect the connected component to other connected components.

Thus, the connected component identifier 222 operates iteratively, starting with the entire graph 201, or some predetermined subgraph of the graph 201, a identifying connected component including a node 213 representing the infected system, deleting high ranked nodes and recording them in the list of nodes for protection 240, and recording the connected component 230 information along with a list of connecting nodes 232 from the nodes for protection 240 for each connecting component. In this way, a set of connected components 230 is determined, each having an associated connecting nodes list. Successive connected components 230 identified by the iteration of the connected component identifier 222 become smaller connected components (in terms of number of nodes) as high ranking nodes with relatively high betweenness centrality are removed and stored in the nodes for protection list 240.

The iteration of the connected component identifier 222 continues until a stopping condition is satisfied. In some embodiments, the stopping condition is determined based on a predetermined subgraph of the graph 201 including the node 213 corresponding to the infected computer system and including nodes within a predetermined path length therefrom. For example, the predetermined subgraph 201 may be a subgraph including the node 213 and neighbors of the node 213 such as first degree, second degree or nth degree neighbors for some predetermined value n. For example, the subgraph can be determined based on how far and how quickly the malware is expected to spread from the infected computer system so as to determine a subgraph of the graph 201 that cannot be reasonably or realistically protected in a period of time, and so constitutes nodes corresponding to sacrificial computer systems (i.e. systems for which it may be too late for protection measures). The predetermined subgraph 201 determines the stopping condition of the iteration of the connected component identifier 222 by comparing a current connected component identified by the identifier 222 with the predetermined subgraph 201. For example, where the current connected component is equal to, or smaller than (e.g. a subset of) the predetermined subgraph, then the iteration may be determined to cease. Such an approach recognizes that there is little benefit in processing connected components being smaller than the predetermined subgraph already identified as corresponding to sacrificial computer systems in the set of systems.

The security service 220 further includes a connected component selector 224 operable to receive a predetermined maximum number of nodes 228 for which protection can be provided, such as a constraint on a number of nodes to which malware protection measures can be triggered for deployment in a period of time. The maximum number of nodes 228 can be selected in conjunction with the predetermined path length used to select a predetermined subgraph of graph 201 for the stopping condition such that a number of computer systems to which malware protection measures can be deployed is determinable for a given period of time during which the malware can be expected to spread to neighboring computer systems, and so the extent of spread in such period of time can serve to define the predetermined subgraph and, correspondingly, the sacrificial computer systems in the set of systems.

The selector 224 accesses information on the connected components 230 identified by the connected component identifier 222 to select a connected component for which malware protection measures are to be triggered. The selected connected component is a component having a smallest number of nodes and being associated with a largest connecting nodes list, provided that the connecting nodes list does not exceeding the predetermined maximum number of nodes for protection 228. Subsequently, the protection trigger 226 triggers the deployment of malware protection measures in respect of computer systems represented by nodes in the connecting nodes list for the identified connected component.

In some embodiments, the security service 220 is further operable to simulate propagation of the malware between nodes in the identified connected component and to simulate the application of malware protection measures applied at nodes selected by each of a plurality of node selection methods. The node selection methods each determine a subset of nodes in the connecting nodes list for the identified connecting component for deployment of protection measures, and can include, for example, inter alia:
    a. Betweenness centrality
    b. Eigenvector centrality
    c. Closeness centrality
    d. K-shell e. Product: f(x, y)=x*y AND f(x, y)=x*y-|x-y/2|, where X are the number of edges connected to infected nodes and Y are the number of edges connected to healthy nodes for healthy node_i to be considered protected.

f. Weighted sum: aX+bY, a and b are weights must be trialed at, where X are the number of edges connected to infected nodes and Y are the number of edges connected to healthy nodes for healthy node_i to be considered protected.

Further, in such embodiments, the deployment of malware protection measures can be triggered for computer systems corresponding to nodes selected by a node selection method determined to be most efficacious in mitigating the spread of the malware. The efficacy is determined by the simulation.

FIG. 3 is a flowchart of a malware protection method according to an embodiment of the present disclosure. Initially, at 302, the method accesses a model 200 of the set of computer systems. The model 200 identifies interacting pairs of the computer systems in the set based on interactions corresponding to previous communication occurring between the computer systems in the pairs. The model includes a graph 201 representation of the computer systems as nodes and interactions therebetween as edges. The method commences an iteration at 304 where a connected component of the graph 201 including a node corresponding to the infected computer system 213 is identified. At 306 nodes in the connected component are ranked by betweenness centrality. At 308 the highest ranked nodes are deleted from the connected component and the graph 201, and an indication or identification of the deleted nodes are added to a list of nodes for protection 240. At 310 the method determines a set of nodes in the list of nodes for protection connecting the current connected component 230 to other connected components. At 312 the determined set of nodes in the list of nodes for protection are recorded as a connecting nodes list 232 for the current connected component 230. At 314 the current connected component 230 and the connecting nodes list 232 are recorded. The method iterates at 316 until a predetermined stopping condition is met. Subsequently, the method proceeds to 318 where the method identifies a connected component 230 having a smallest number of nodes and being associated with a largest connecting nodes list 232, where the connecting nodes list 232 does not exceed a predetermined maximum number of nodes 228 for protection. Subsequently, at 320, the method triggers the deployment of malware protection measures in respect of computer systems represented by nodes in the connecting nodes list 232 for the identified connected component 230.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented malware protection method to mitigate malware spread within a set of communicating computer systems from an infected computer system, the method comprising:
   accessing a model of the set of communicating computer systems, the model identifying interacting pairs of the computer systems in the set based on interactions corresponding to previous communication occurring between the computer systems in the pairs, wherein the model includes a graph representation of the computer systems as nodes and the interactions corresponding to the previous communication therebetween as edges;
   iteratively processing the graph by:
      identifying a connected component of the graph including a node corresponding to the infected computer system,
      ranking nodes in the identified connected component by betweenness centrality and removing one or more highest ranked nodes from the connected component, wherein the betweenness centrality is a measure of the centrality in the graph based on shortest paths,
      recording an identification of the connected component and adding the removed one or more highest ranked nodes to a list of nodes for protection, and
      determining a set of nodes in the list of nodes for protection that connect the connected component to other connected components as the connecting nodes list for the connected component,
      wherein the iterative processing terminates when the identified connected component satisfies a predetermined stopping condition;
   receiving a predetermined maximum number of nodes for protection;
   identifying the connected component having a smallest number of nodes and being associated with a largest connecting nodes list not exceeding the predetermined maximum number of nodes for protection; and
   triggering deployment of malware protection measures in respect of computer systems represented by nodes in the connecting nodes list for the identified connected component.

2. The method of claim 1, further comprising:
determining a subgraph of the graph, the subgraph including the node corresponding to the infected computer system and a set of nodes within a predetermined path length therefrom,
wherein the predetermined stopping condition includes a condition that an identified connected component is equal to or a subset of the determined subgraph.

3. The method of claim 1, further comprising:
simulating propagation of the malware between nodes in the identified connected component; and
simulating the application of malware protection measures applied at nodes selected by each of a plurality of node selection methods, each node selection method determining a subset of nodes in the connecting nodes list for the identified connecting component for deployment of protection measures,
wherein the deployment of the malware protection measures is triggered for computer systems corresponding to nodes selected by a node selection method determined to be most efficacious in mitigating the spread of the malware.

4. A computer system including a processor and memory storing computer program code for performing a malware protection method to mitigate malware spread within a set of communicating computer systems from an infected computer system, the method comprising:
accessing a model of the set of communicating computer systems, the model identifying interacting pairs of the computer systems in the set based on interactions corresponding to previous communication occurring between the computer systems in the pairs, wherein the model includes a graph representation of the computer systems as nodes and the interactions corresponding to the previous communication therebetween as edges;
iteratively processing the graph by:
identifying a connected component of the graph including a node corresponding to the infected computer system,
ranking nodes in the identified connected component by betweenness centrality and removing one or more highest ranked nodes from the connected component, wherein the betweenness centrality is a measure of the centrality in the graph based on shortest paths,
recording an identification of the connected component and adding the removed one or more highest ranked nodes to a list of nodes for protection, and
determining a set of nodes in the list of nodes for protection that connect the connected component to other connected components as the connecting nodes list for the connected component,
wherein the iterative processing terminates when the identified connected component satisfies a predetermined stopping condition;
receiving a predetermined maximum number of nodes for protection;
identifying the connected component having a smallest number of nodes and being associated with a largest connecting nodes list not exceeding the predetermined maximum number of nodes for protection; and
triggering deployment of malware protection measures in respect of computer systems represented by nodes in the connecting nodes list for the identified connected component.

5. A non-transitory computer-readable storage medium comprising computer program code to, when loaded into a computer system and executed thereon, cause the computer system to perform a malware protection method to mitigate malware spread within a set of communicating computer systems from an infected computer system, the method comprising:
accessing a model of the set of communicating computer systems, the model identifying interacting pairs of the computer systems in the set based on interactions corresponding to previous communication occurring between the computer systems in the pairs, wherein the model includes a graph representation of the computer systems as nodes and the interactions corresponding to the previous communication therebetween as edges;
iteratively processing the graph by:
identifying a connected component of the graph including a node corresponding to the infected computer system,
ranking nodes in the identified connected component by betweenness centrality and removing one or more highest ranked nodes from the connected component, wherein the betweenness centrality is a measure of the centrality in the graph based on shortest paths,
recording an identification of the connected component and adding the removed one or more highest ranked nodes to a list of nodes for protection, and
determining a set of nodes in the list of nodes for protection that connect the connected component to other connected components as the connecting nodes list for the connected component,
wherein the iterative processing terminates when the identified connected component satisfies a predetermined stopping condition;
receiving a predetermined maximum number of nodes for protection;
identifying the connected component having a smallest number of nodes and being associated with a largest connecting nodes list not exceeding the predetermined maximum number of nodes for protection; and
triggering deployment of malware protection measures in respect of computer systems represented by nodes in the connecting nodes list for the identified connected component.

* * * * *